(12) United States Patent
Wolf et al.

(10) Patent No.: US 7,478,968 B2
(45) Date of Patent: Jan. 20, 2009

(54) ROCKER PENDULUM MADE OF AN EXTRUDED SECTION

(75) Inventors: Georg Wolf, Osnabrück (DE); Frank Budde, Damme (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 188 days.

(21) Appl. No.: 10/860,701

(22) Filed: Jun. 3, 2004

(65) Prior Publication Data

US 2004/0262873 A1 Dec. 30, 2004

Related U.S. Application Data

(63) Continuation of application No. PCT/DE03/02110, filed on Jun. 25, 2003.

(30) Foreign Application Priority Data

Jun. 25, 2002 (DE) .................. 102 28 370

(51) Int. Cl.
*F16C 11/04* (2006.01)
(52) U.S. Cl. .................. 403/162; 403/161; 403/164; 403/292; 411/510; 280/93.511
(58) Field of Classification Search .......... 403/119, 403/161, 162, 163, 164, 165, 292, 298; 280/93.51, 280/93.511; 411/509, 510
See application file for complete search history.

(56) References Cited

U.S. PATENT DOCUMENTS

| 1,153,986 | A | * | 9/1915 | Whitney ............... 403/162 |
| 4,268,018 | A | * | 5/1981 | Langanke ............. 267/120 |
| 4,579,473 | A | * | 4/1986 | Brugger ............... 403/163 |
| 4,874,649 | A | | 10/1989 | Daubenbüchel et al. |
| 5,303,507 | A | * | 4/1994 | Oille ................ 49/74.1 |
| 5,522,280 | A | * | 6/1996 | Bexten ............... 403/282 |
| 6,007,079 | A | | 12/1999 | Kincaid et al. |
| 6,398,446 | B1 | | 6/2002 | Pazdirek et al. |
| 6,666,467 | B2 | * | 12/2003 | Bernhardt ............ 280/93.51 |
| 2001/0050469 | A1 | | 12/2001 | Bernhardt |

FOREIGN PATENT DOCUMENTS

| DE | 37 08 006 A1 | 9/1988 |
| DE | 195 04 086 A1 | 8/1996 |
| DE | 198 05 810 A1 | 8/1998 |
| DE | 200 10 341 U1 | 11/2000 |
| EP | 0 149 979 | 7/1985 |
| EP | 0 636 504 A1 | 2/1995 |
| EP | 0 925 964 A2 | 6/1999 |
| EP | 1 217 233 A1 | 6/2002 |

* cited by examiner

*Primary Examiner*—Michael P Ferguson
(74) *Attorney, Agent, or Firm*—McGlew & Tuttle, P.C.

(57) ABSTRACT

A rocker pendulum for a motor vehicle has an oblong basic body via at least one fastening element, wherein the basic body is a hollow extruded section.

30 Claims, 11 Drawing Sheets

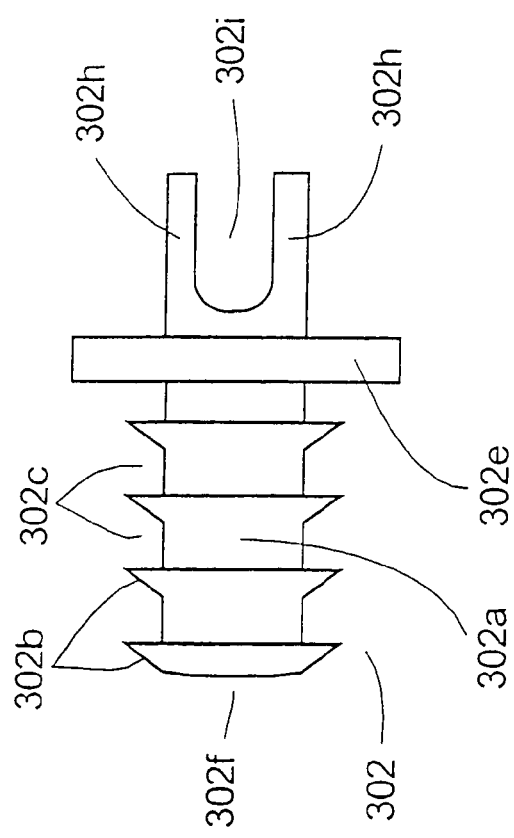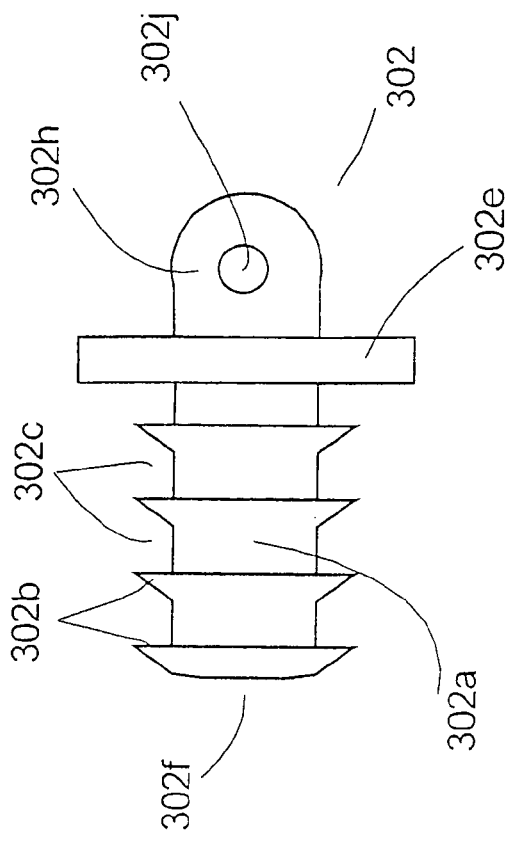

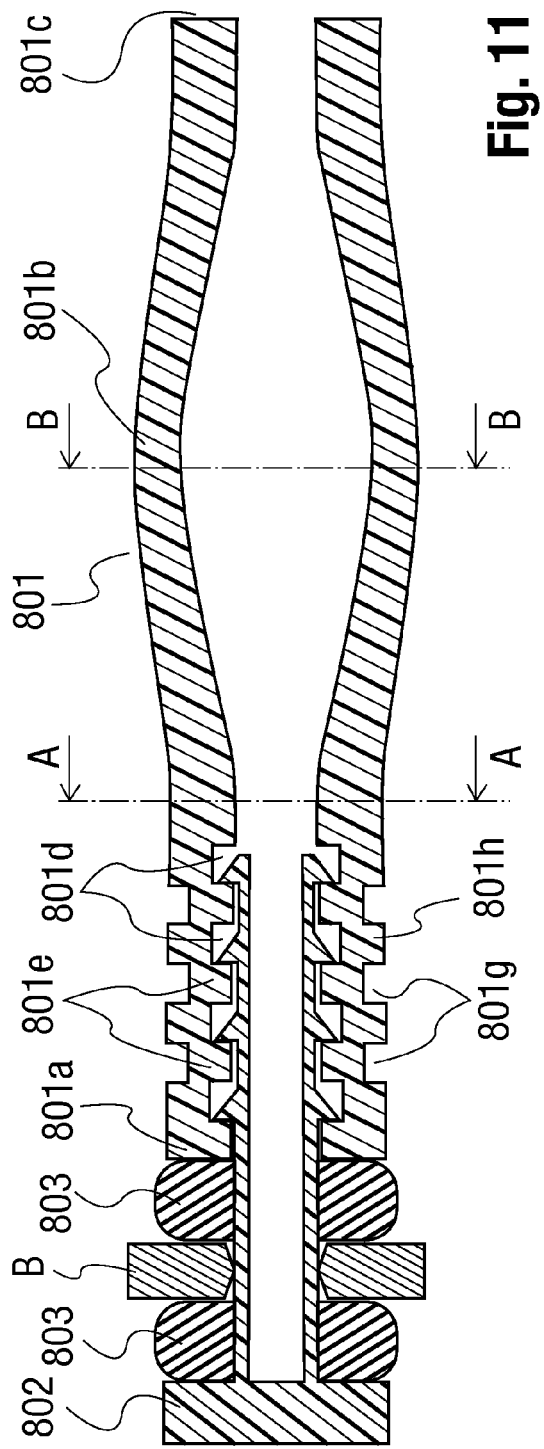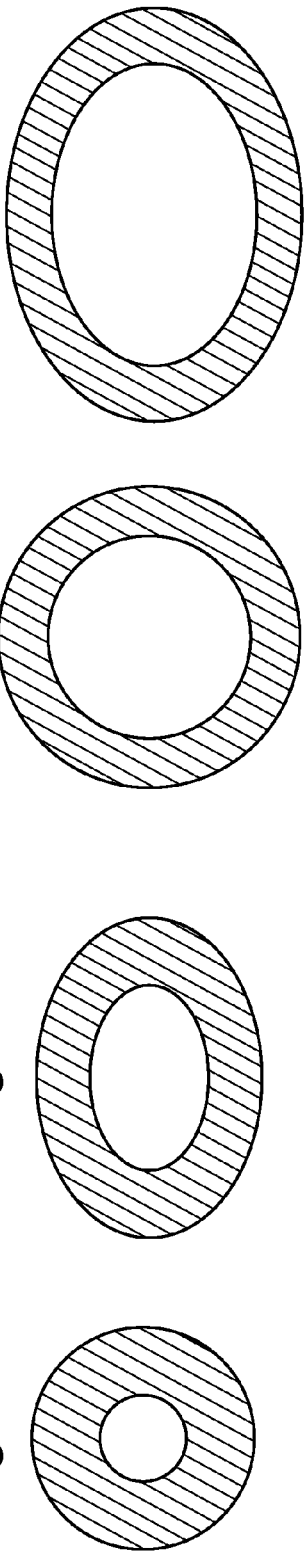

ROCKER PENDULUM MADE OF AN EXTRUDED SECTION

CROSS REFERENCE TO RELATED APPLICATION

This is a continuation of and claims the benefit (35 U.S.C. §120 and 365(c)) of copending International Application PCT/DE 2003/002110 of Jun. 25, 2003, which designated inter alia the United States and which claims the priority of German Application DE 102 28 370.2 of Jun. 25, 2002. The entire contents of each application is hereby incorporated by reference in its entirety.

FIELD OF THE INVENTION

The present invention pertains to a rocker pendulum according for a motor vehicle, with an oblong basic body, which can be connected with motor vehicle components by means of at least one fastening element.

BACKGROUND OF THE INVENTION

Rocker pendulums are used in motor vehicles to connect the stabilizer and the pivot bearing and the axle of a motor vehicle. Rocker pendulums are usually characterized by a high dynamic load-bearing capacity and at the same time corrosion resistance.

Rocker pendulums used in passenger cars are currently manufactured from metal or plastic. Contrary to rocker pendulums made of plastic, metallic components are relatively heavy. However, they have the advantage that their length can be varied by simple connection methods, e.g., friction welding. By contrast, even though rocker pendulums made of plastic advantageously have a low weight, a separate injection mold must be prepared for each length needed, which causes relatively high costs. The injection-molded rocker pendulums disadvantageously have, moreover, joint lines, so that the component must be dimensioned for a larger size in order to compensate this weakness.

There are various embodiments of rocker pendulums. To guarantee the mobility of the components in relation to one another, the rocker pendulums have, for example, ball pins or ball-and-socket joints on one side or on both sides. The individual components, such as the ball socket and the ball pivot, must be machined to ensure the good function of these joints. In addition, a sealing system in the form of, e.g., a sealing bellows is necessary in order to protect the ball-and-socket joints, which are, in general, lubricated, from dirt and corrosion.

SUMMARY OF THE INVENTION

The object of the present invention is to provide a rocker pendulum that has a simple design and can be easily mounted.

This object is accomplished according to the present invention by a rocker pendulum having an oblong basic body at least one said fastening element. The oblong basic body can be connected with the motor vehicle components by means of the fastening element. The basic body is a hollow extruded section.

The rocker pendulum according to the present invention advantageously has a simple design and can consequently be manufactured at a low cost. The length of the rocker pendulum can be easily varied, because the extruded section can be easily shortened by means of suitable tools, for example, a saw, by sawing off the basic body. Due to the advantageous manufacturing process available for manufacturing the basic body, the latter has no joint lines, as they are formed, among other things, due to the injection molding process, for example, because of the flow around cores. As a result, higher stability is attained at comparable dimensions, so that the rocker pendulum as a whole can be made lighter with equal properties. To attain an especially high strength, the basic body should preferably be manufactured from a reinforced plastic. A rocker pendulum manufactured in this manner can advantageously transmit strong tensile and compressive forces, and the requirements imposed in terms of bending forces are met as well. Due to the advantageously selected extrusion process, basic bodies of different lengths can be manufactured with one machine, as a result of which the manufacturing costs remain low. The reinforcing fibers are oriented in the direction of load during the extrusion process.

The basic body advantageously has grooves, which are parallel to one another in the longitudinal direction of the basic body and cooperate with projections of a fastening element as snap connections. The grooves or recesses may be arranged on the basic body on the outside and/or on the inside. Due to this design, the rocker pendulum can be mounted relatively easily, because the fastening elements can be easily introduced into or pushed over the front sides of the basic body without tools, after which they are reliably secured against being unintentionally lost due to the snap connection or screw connection. The fastening elements are advantageously designed such that they can be easily fastened to a component of the vehicle body or directly to the vehicle body. In the simplest cases, the fastening element or a bolt or screw associated with the fastening element passes through a suitable opening of the component or vehicle body. If the fastening element is to make possible the mobility between the basic body and the component or the vehicle body itself, the fastening element is advantageously made of a softer material, as a result of which it can bent to the required extent.

If the fastening element is manufactured from a stronger material, additional elastic elements form a joint together with the other components between the rocker pendulum and the motor vehicle component fastened thereto, so that certain rotary and tilting movements are possible between the components. It is advantageous in this case for the component not to have direct contact with the fastening element, but only with the elastic elements. The elastic elements are advantageously made of rubber or TPE (thermoplastic elastomers, also expanded). The fastening element is advantageously made of a thermoplastic material and is nonreinforced or reinforced, as required, so that it can always be manufactured in a simple manner and at a low cost according to the injection molding process.

Due to the peripheral grooves of the basic body being shaped such that they have a rectangular cross section and due especially to the peripheral projections of the fastening element being shaped such that they have a cross section in the form of sawtooth-shaped teeth, a snap connection is created, which forms a nondetachable connection between the basic body and the fastening element. The peripheral recesses or grooves of the basic body may, of course, also have a sawtooth-shaped cross section, in which case the steep flanks of the projections and grooves reliably prevent the unintended separation of the mounted fastening element.

The fastening elements may, moreover, act as plugs, which close one front side each of the basic body designed as a hollow section. Additional sealing elements may be used to improve sealing. It is also possible to bond or weld the basic body to the fastening element. Even better securing against unintentional separation of the connection between the basic body and the fastening element is achieved as a result. Furthermore, no additional sealing elements are needed any longer.

If the recesses and grooves according to the present invention are arranged on the outside, it is also possible to provide two fastening elements, which enclose the basic body and are pushed over the basic body from two sides. In this case, the fastening elements preferably have peripheral projections on their inner surfaces facing the jacket surface of the basic body, especially in the form of sawteeth, which cooperate with the recesses of the basic body. The component to be fastened in the rocker pendulum is arranged between the fastening elements, and the component may also enclose, e.g., the basic body. The fastening elements hold the component between them in position, and elastic elements may also be arranged between the fastening element and the component for better mobility, unless the fastening elements are manufactured from a sufficiently soft material at least on their first areas adjoining the component. The fastening elements and/or the elastic elements are preferably to be designed such that the component does not come into contact with the basic body. An outwardly directed collar, which is in contact with the at least one elastic element and applies pressure to same, may advantageously be made in one piece with the ends of the first area of each fastening element, which said ends face each other.

It is apparent that the motor vehicle component may be any part of any desired shape, which is loosely or rigidly connected to the body of a vehicle. Thus, it is also possible for the motor vehicle component to be a screw with a ring-shaped head, in which case the ring forms the window-like opening through which the fastening element or a bolt or a securing pin of the fastening clement passes or which encloses the basic body. The number of locks engaging one another between the basic body and the fastening element is always to be adapted to the particular requirements. Thus, the depth and/or the shape of the recesses or grooves as well as the height and/or the shape of the projections of the fastening elements are also to be adapted to the particular requirements. In order to make it possible to push the fastening element better into or onto the basic body, the area having the projections may, moreover, also be of a slotted design. It is likewise possible to provide the recesses or grooves on the fastening element and the projections on the basic body, as a result of which the function is merely reversed.

The possible embodiments of the rocker pendulum according to the present invention shown are advantageously composed from a small number of components that can be manufactured at a low cost and in a simple manner, so that a low-cost rocker pendulum is obtained.

Some possible embodiments of the rocker pendulum according to the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 5a is a side view of a fastening element according to FIG. 5;

FIG. 5b is shows the side view turned by 90° of a fastening element according to FIG. 5;

FIG. 11 is a longitudinal sectional view of another basic body manufactured according to a blow molding process;

FIG. 12A is a cross-sectional view along line A-A of FIG. 11 of the end of the basic body according to FIG. 11.

FIG. 12B is a cross-sectional view along line A-A of FIG. 11 of the end of the basic body according to an alternative version of the embodiment of FIG. 11.

FIG. 13A is a cross-sectional view along line B-B of FIG. 11 of the end of the basic body according to FIG. 11.

FIG. 13B is a cross-sectional view along line B-B of FIG. 11 of the end of the basic body according to an alternative version of the embodiment of FIG. 11.

DESCRIPTION OF THE PREFERRED EMBODIMENT

Figure 1:
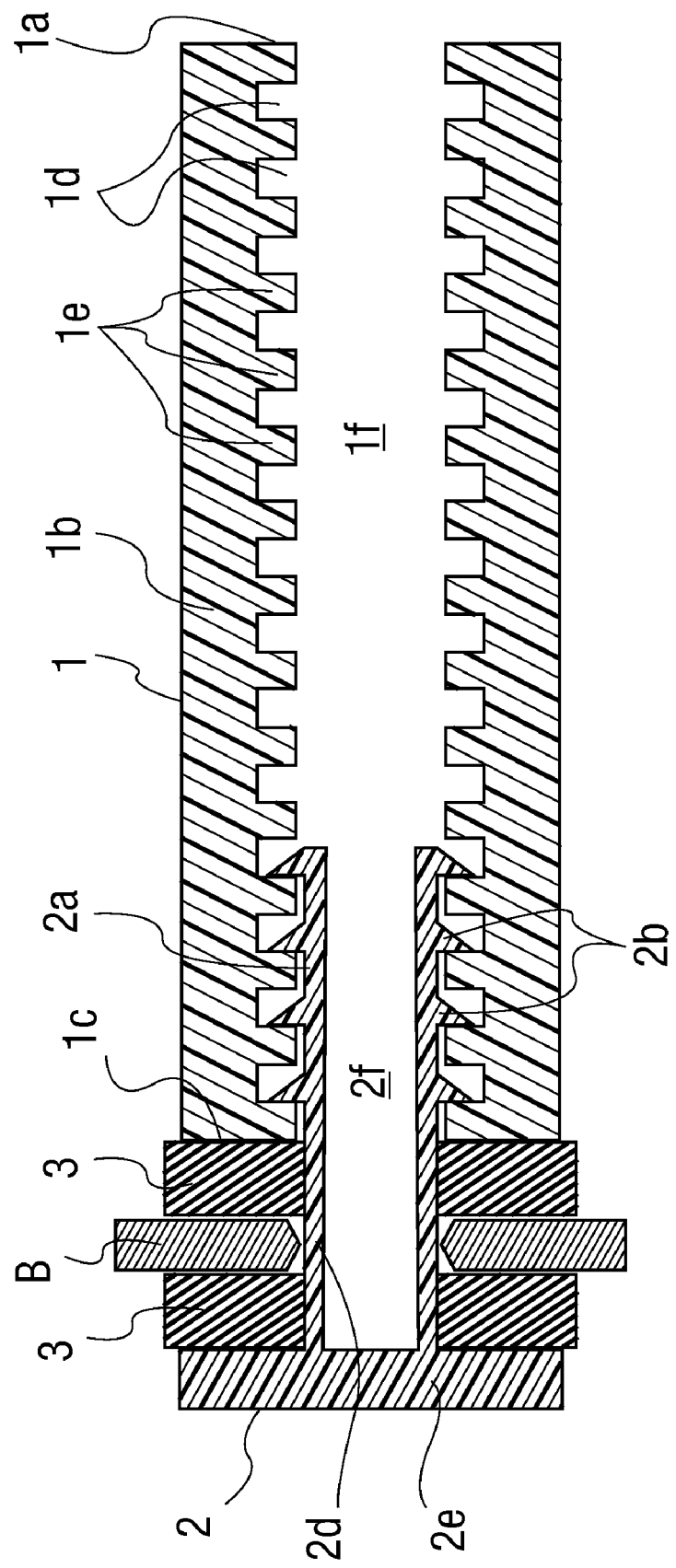
FIG. 1 is a cross-sectional view of a first embodiment of a basic body according to the present invention with a fastening element mounted on one side.

FIG. 1 shows a first possible embodiment of a basic body 1, which is designed as a hollow extruded section. The basic body 1 has a middle area 1b as well as front sides 1a and 1c, in which the cavity 1f ends. At its inner wall forming the cavity 1f, the basic body 1 has projections 1e and recesses 1d, which together form peripheral grooves of a rectangular cross section. These recesses and grooves 1d form locks together with the peripheral projections 2b of a fastening element 2, which have a wedge-shaped or sawtooth-shaped cross section, so that the fastening element 2 cannot be removed any longer without destruction of the fastening element or the basic body after it has been pushed into a front side 1a or 1c of the basic body. The fastening element 2 has the shape of a screw, the screw head 2e being designed as a limiting element with a collar. An intermediate area 2d is made in one piece with the head area 2e, and the intermediate area 2d passes over into a first area 2a, which has the projections or teeth 2b extending peripherally on the outside. To fasten a motor vehicle component B, an elastic element 3 is first pushed over the shaft area or intermediate area 2d as well as the first area 2a up to the limiting element 2e. Then, the fastening element 2 is first pushed with its first area 2a through an opening of a component B, after which another elastic element 3 is pushed over the intermediate area 2d. The fastening element 2 with its first area 2a is then pushed into the opening of the front side 1c of the basic body 1, and the projections 2b are bent inwardly in the process because of their oblique contact surfaces, and the first area 2a is likewise compressed because a slot is provided in this area. The projections 2b engage the recesses or grooves 1d of the basic body 1, and they reliably prevent the fastening element 2 from being pulled out after the mounting because of their special shape.

Figure 1A:
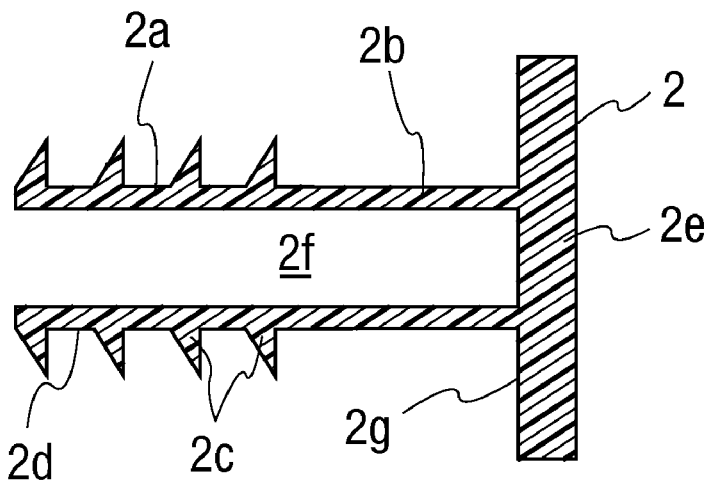
FIG. 1a is a cross-sectional view of the fastening element according to FIG. 1.
Figure 1B:
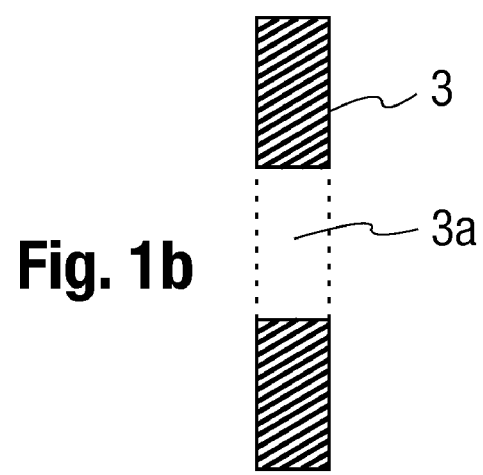
FIG. 1b is a cross-sectional view of the elastic element according to FIG. 1.

FIG. 1a shows a cross-sectional view of the fastening element 2, which is mounted in FIG. 1. FIG. 1b likewise shows a cross-sectional view of the annular elastic element 3 with its central passage opening 3a.

Figure 2:
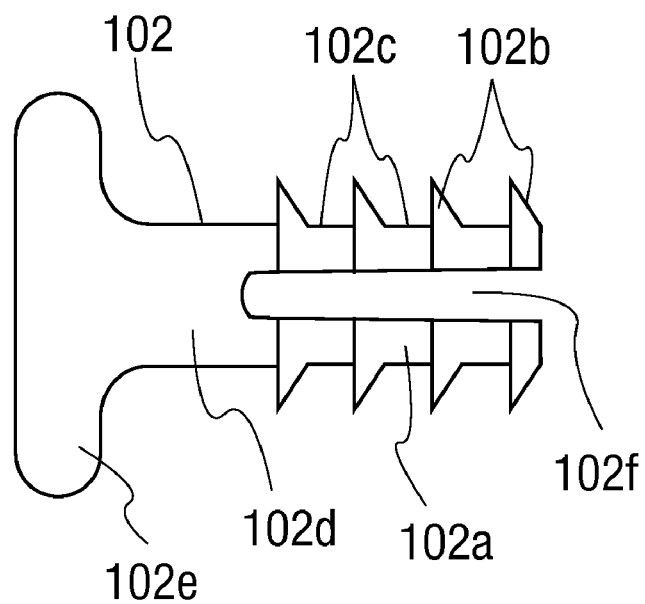
FIG. 2 is a side view of an alternative fastening element.

FIG. 2 shows a side view of a fastening element 102 of an alternative embodiment. The limiting element 102e has rounded corners, contrary to the fastening element according to FIGS. 1 and 1a. The first area 102 has a slotted design, so that the two sections of the fastening element 102, which is equipped with projections 102b, intermediate spaces 102c and a cavity 102f, which such sections form the first area 102a, can be bent inwardly, so that the projections may optionally be made somewhat harder, and even better locking behavior of the fastening element 102 is thus achieved. The intermediate area 102d, which adjoins an elastic means, is likewise used to pass through at least one elastic means, as is shown, for example, in FIG. 1b, as well as through a motor vehicle component. The length of the intermediate area 102d is to be adapted to the thickness of the motor vehicle component as well as of the elastic element 103 to be passed through.

Figure 3:
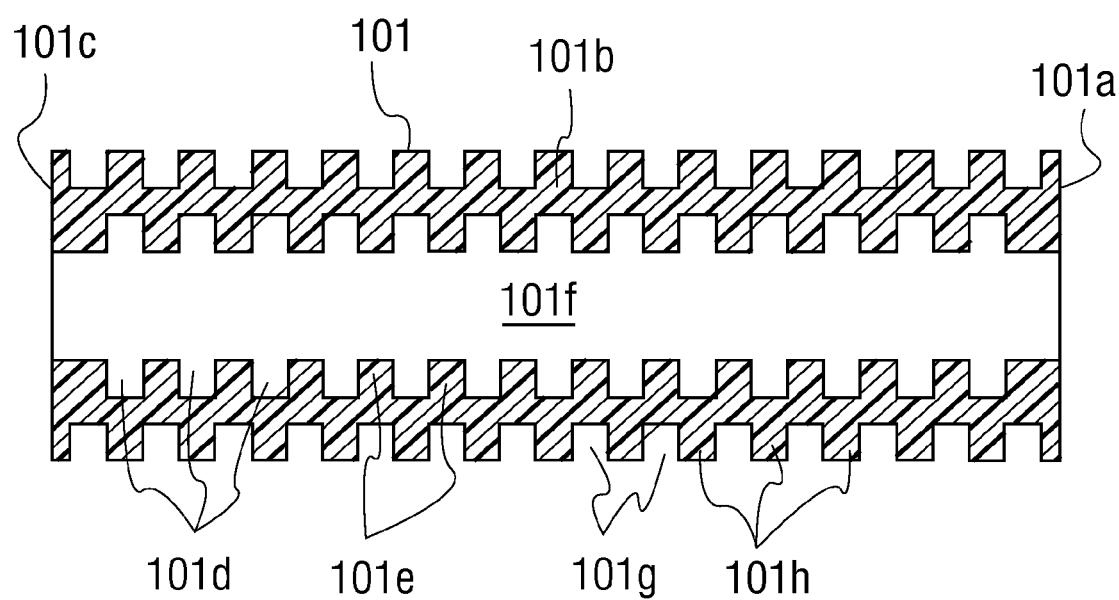
FIG. 3 is a cross-sectional view of a second embodiment of a basic body according to the present invention.
Figure 8:
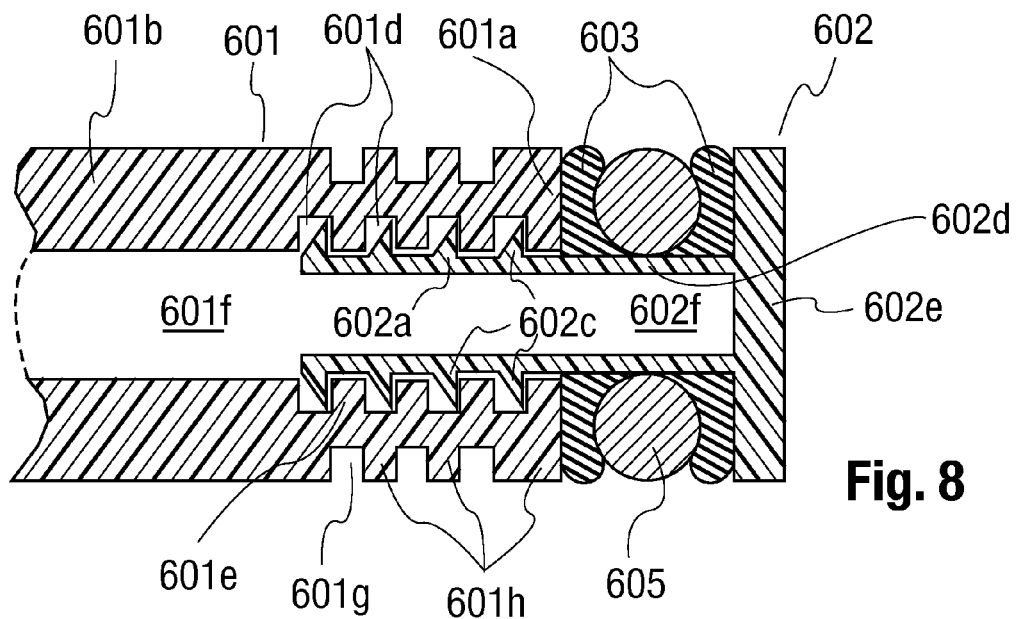
FIG. 8 is a cross-sectional view of a cross-sectional view of another alternative embodiment of a rocker pendulum according to the present invention.

FIG. 3 shows an alternative embodiment of a basic body 101, which is manufactured as a doubly corrugated extruded section provided with a cavity 101f. On its outer as well as inner jacket surfaces, the basic body 101 has peripheral recesses 101d, 101g, which are formed by projections 101e, 101h and extend from the front side 101a to the other front side 101c over the middle area 101b. It is, of course, possible, as is shown in FIG. 8, for the peripheral recesses or grooves not to extend over the entire length of the basic body, but only in the areas or end areas that cooperate with the fastening elements.

Figure 4:
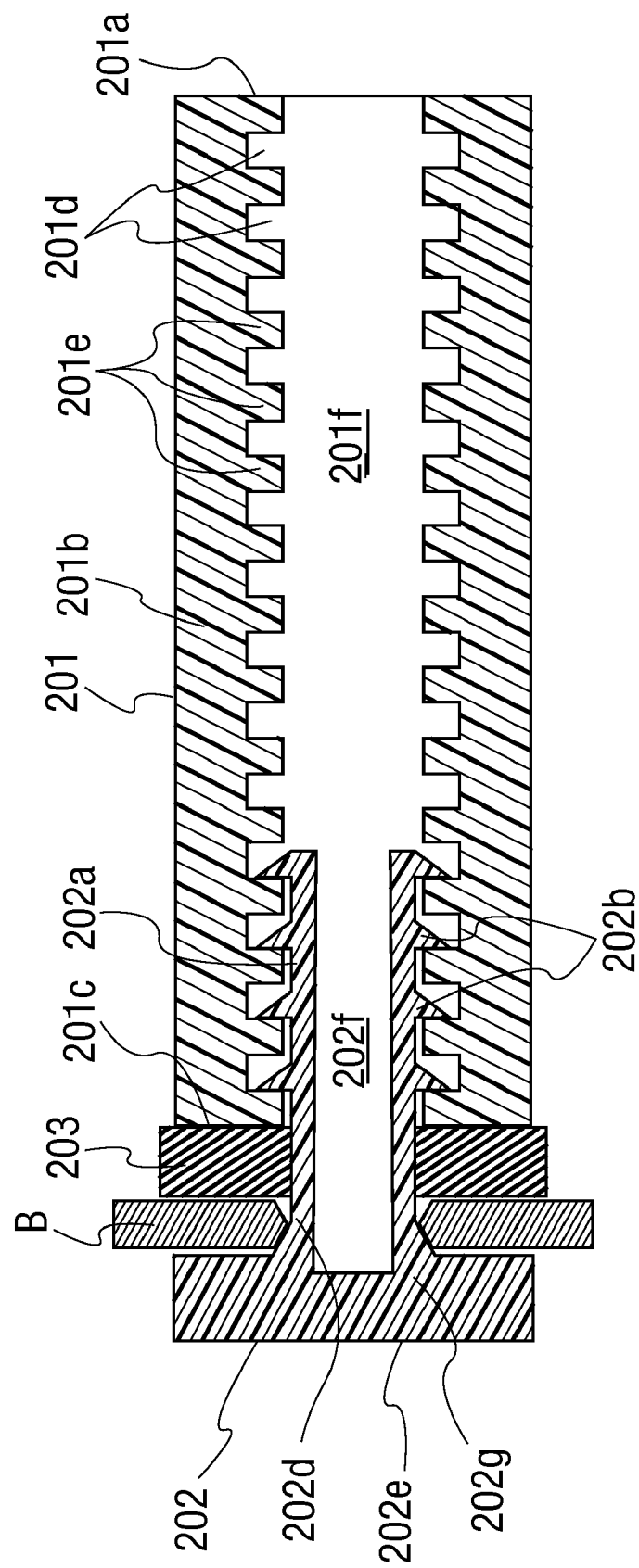
FIG. 4 is a cross-sectional view of a basic body according to the present invention with a fastening element mounted on a front side.

FIG. 4 shows another possible embodiment of a rocker pendulum according to the present invention, in which a motor vehicle component B is fastened by means of a fastening element 202 as well as an elastic element 203 only as an example. The fastening element 202 is made of a somewhat softer material and can thus be bent easily, so that an elastic connection is obtained between the component B and the basic body 201, the basic body 201 having a middle area 201b, a first front side 201a as well as a second front side 201c and peripheral recesses 201d with lateral limitations 201e of these recesses as well as a through cavity 201f. The elastic element 203 is located between the front side 201c and the component B in order to ensure that they can move relatively easily. It is apparent that the rigidity of the fastening element must be selected correspondingly depending on the relative movements needed between the component B and the basic body 201. It is also possible for the first area 202a with its projections 202b to be made of a stronger, e.g., glass fiber-reinforced plastic, so that this area has a higher flexural strength and strength than the other areas 202d and 202e. It is ensured as a result that there is a permanent locking between the basic body 201 and the fastening element 202, and a sufficiently great relative movement is nevertheless possible between the motor vehicle component B and the basic body 201. The transition 202g between the intermediate area 202d and the limiting element 202e of the fastening element 202 is to be adapted or selected corresponding to the contours of the component B.

Figure 5:
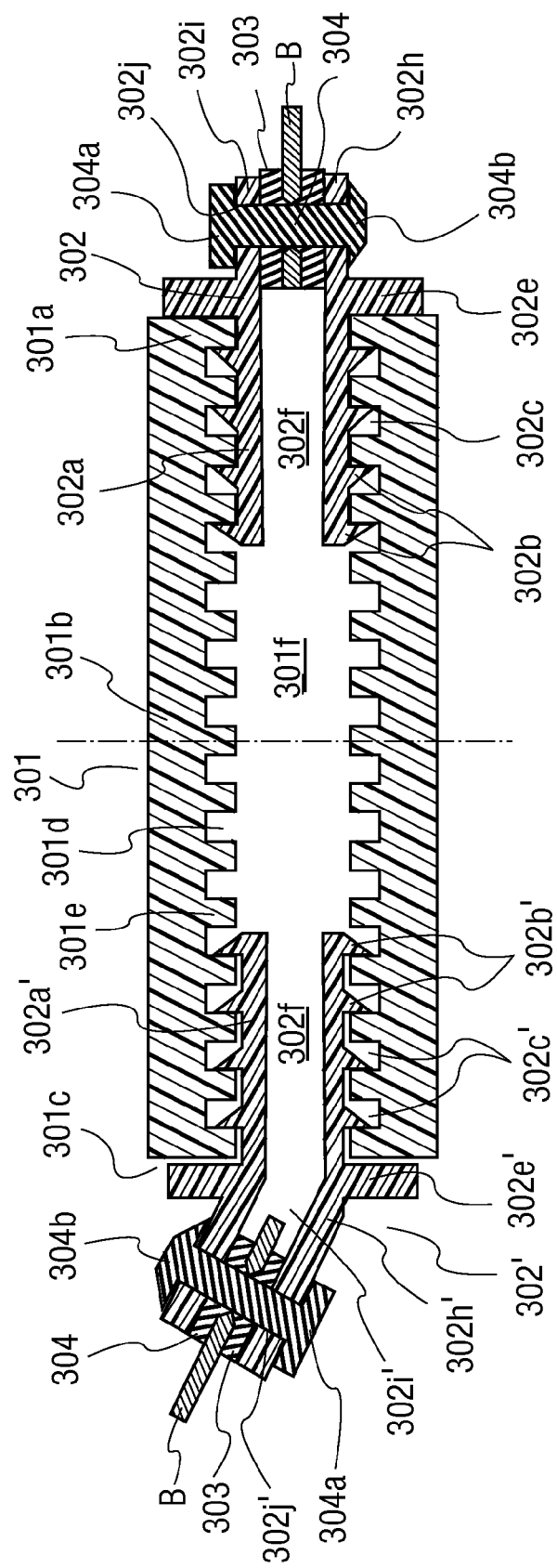
FIG. 5 is a cross-sectional view of another alternative embodiment of a rocker pendulum according to the present invention.

FIG. 5 shows another alternative embodiment of a rocker pendulum according to the present invention, in which two possible types of fastening elements 302 and 302' are locked in the respective front sides 301a and 301c of the basic body 301. The fastening elements 302 and 302' are designed such that they are in contact with their respective limiting elements 302e and 302e' with the respective front sides 301a and 301c of the basic body 301. The motor vehicle component B is fastened to a respective fastening means 302h and 302h' made in one piece with the respective limiting elements 302e and 302e' by means of a securing means 304 in the form of a pin and an elastic element 303. The component B is located between the two respective fastening means 302h and 302h' designed as walls, and the elastic elements 303 ensure that a relative movement is possible between the respective fastening element 302, 302' and the component B.

FIG. 5a shows a side view and FIG. 5b shows a view turned by 90° of a fastening element 302, as is shown in the right-hand part of FIG. 5. The fastening means 302h are designed as two walls, which are parallel to one another, are arranged at spaced locations from one another and are made in one piece with the fastening element 302e. The component B, bordered by an elastic means 303, can be arranged in the intermediate space 302i formed by the walls 302h. As is shown in FIG. 5b, the walls 302h have window-like, round openings 302j, through which a securing means 304 passes. The securing means 304 passes, moreover, through corresponding openings of the elastic element 303 as well as of the component B. The securing means 304 has a head 304a as well as a locking tip 304b, which are connected to one another by means of a shaft. The locking tip 304b has a peripheral collar, whose external diameter is greater than the diameter of the circular opening 302j, so that the securing means is captively connected with the fastening element 302 after it has been passed through.

It is, of course, possible for the motor vehicle component to have another shape, so that, e.g., the motor vehicle component extends around the fastening means 302h. It is also possible for the fastening means 302h or the entire fastening element 302 to be made of such a soft material that an elastic element 302, which is arranged between the component B and the fastening element, can be eliminated.

Figure 6:
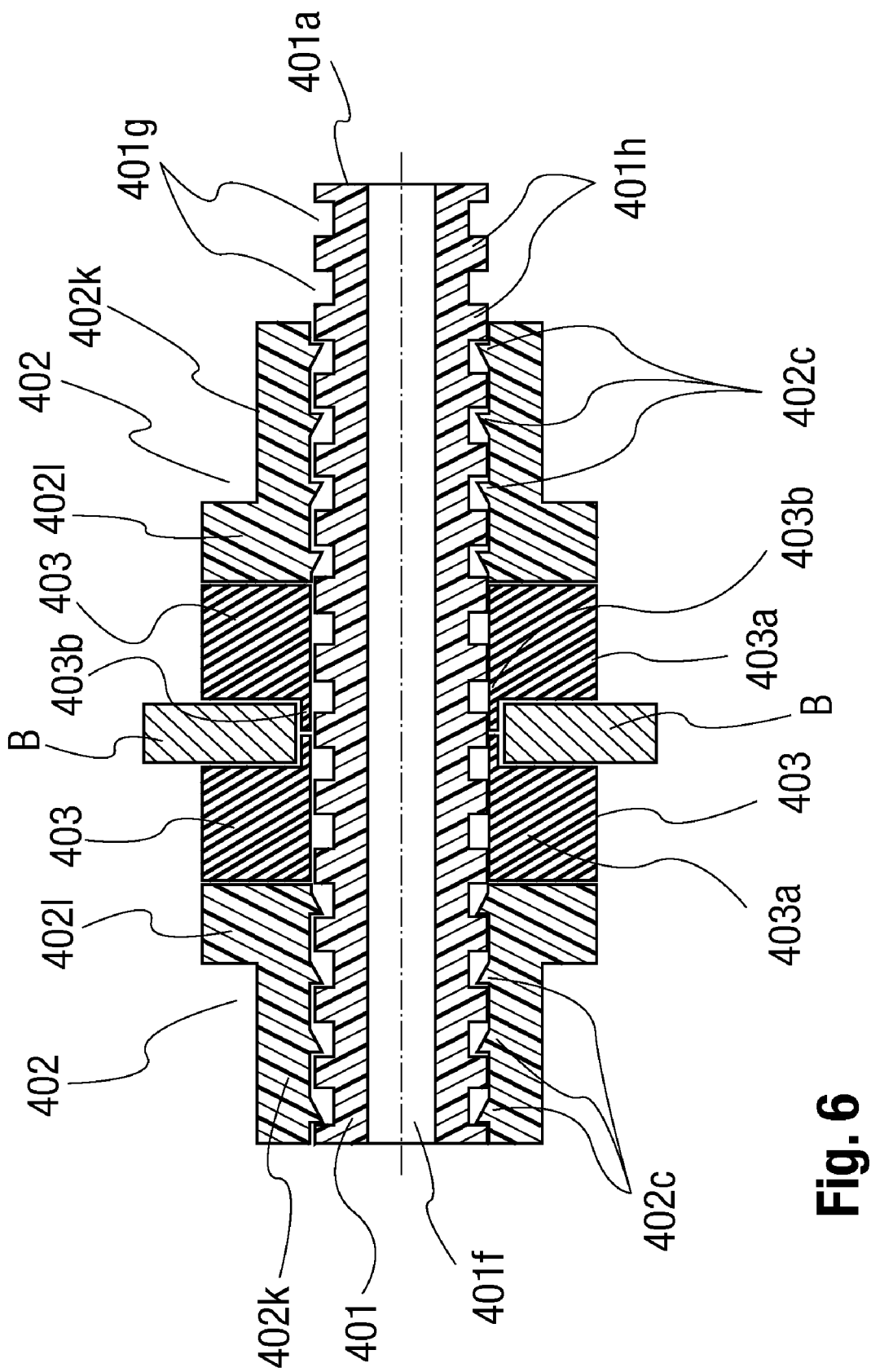
FIG. 6 is a cross-sectional view of a third possible embodiment of a rocker pendulum.

FIG. 6 shows an alternative for fastening a motor vehicle component B in a basic body 401, where the component B surrounds the basic body 401 and is inserted between two elastic elements 403, which are in turn pressed together from the outside by means of two fastening elements 402 pushed over the basic body. The elastic elements 403 have projections 403b, which are made in one piece with the basic body 403a, and which are inserted between the component B and the outer jacket surface of the basic body 401, so that the component B does not come into direct contact with the basic body 401. The fastening elements 401 have a sleeve-like body 402k, with which an outwardly projecting collar 402l is made in one piece. The sleeve-like body 402k has projections 402c, which are peripheral on its inner jacket surface or are individual projections, and which are located at corresponding distances from one another, just as the recesses or grooves 401g and lockingly engage same. The sawtooth-shaped projections 402c of the two fastening elements 402 are arranged such that the fastening elements 402, once pushed over, cannot move away from each other any longer and thus reliably press together the component B and the elastic elements 403. It is, of course, possible for the motor vehicle component B to fully or partially surround the basic body 401.

Figure 7:
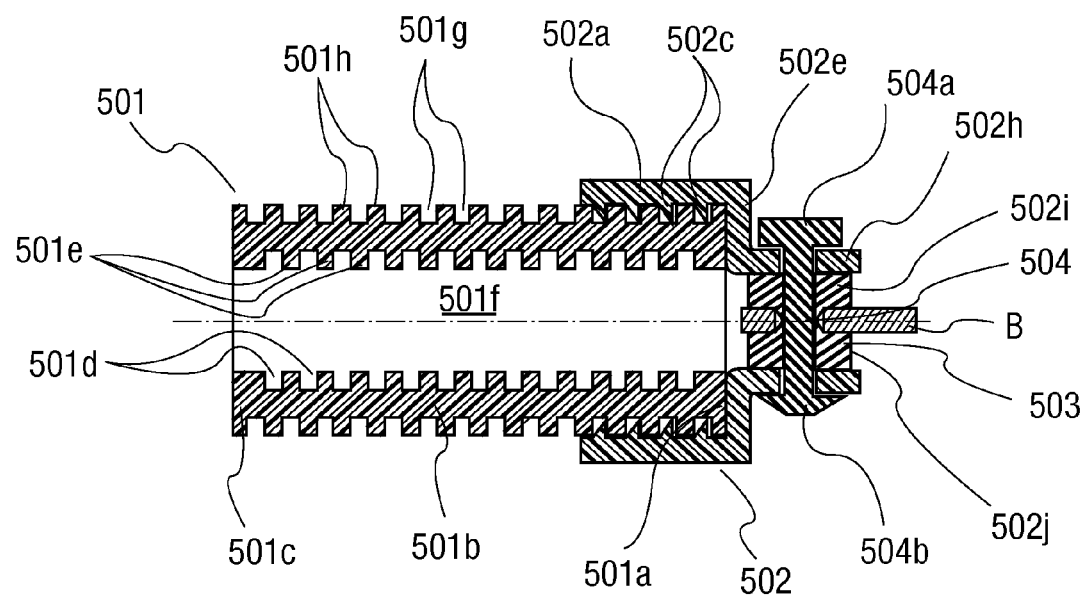
FIG. 7 is a cross-sectional view of a fourth possible embodiment of the fastening of a fastening element to a basic body.

FIG. 7 shows another alternative embodiment of a rocker pendulum according to the present invention, in which only one front side of a basic body 501 with the component B fastened thereto is shown. The basic body 501 has peripheral recesses or grooves 501e and 501g on the outside and on the inside. The inner peripheral recesses or grooves 501e may also be done away with, if necessary, among other things, for reasons of stability, because only the outer recesses or grooves 501g are used to lock the fastening element 502. The fastening element 502 has a first area 502a, which has the shape of a sleeve, at the inner wall of which peripheral projections 502c are arranged. The projections 502c are arranged at distances from one another that correspond to the distances of the grooves 501g. The height of the projections approximately corresponds to the depth of the recesses or grooves 501g. The first area 502a is adjoined by an area 502e, which acts as a limitation, so that the fastening element, once pushed over the basic body, can perform only a very small relative movement, if any, in relation to the basic body. The area 502e is adjoined by fastening means 502h, and the fastening of the component B to the fastening means 502h functionally corresponds to that in the exemplary embodiment according to FIGS. 5, 5a and 5b.

Figure 9:
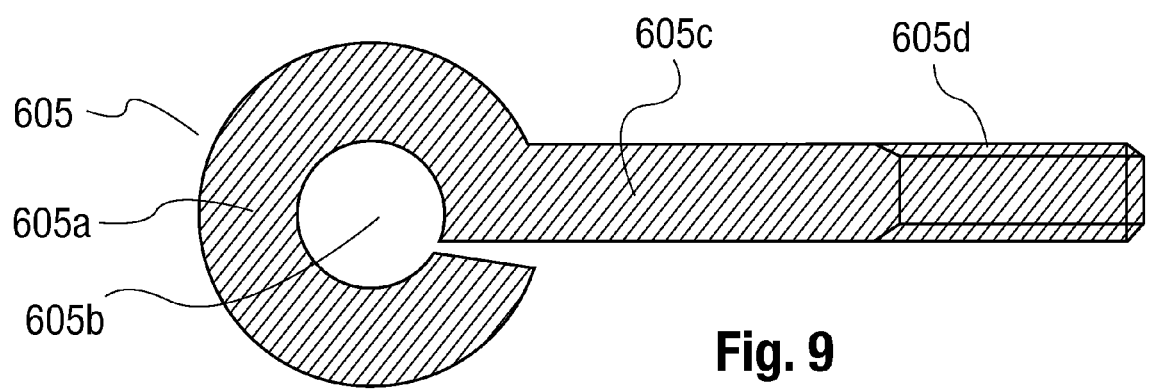
FIG. 9 is a cross-sectional view of a screw for connecting the rocker pendulum to a motor vehicle component.

FIG. 8 shows another alternative embodiment of a rocker pendulum according to the present invention with a motor vehicle component fastened thereto, where the motor vehicle component is designed, as is shown in FIG. 9, as a screw with a ring-shaped head, and the ring head 605a forms an eye 605b, through which the fastening element 602 passes with its first area 602a and with the intermediate area 602d in the mounted state. An elastic element 603 of a corresponding shape is located between the front side 601a and the ring head 605a. Another elastic element 603 is likewise located between the ring head 605a and the head or limiting element 602e of the fastening element 602. Due to the elastic elements 603, the screw 605 can perform a relative movement in relation to the fastening element 602 and the basic body 601.

Figure 10:
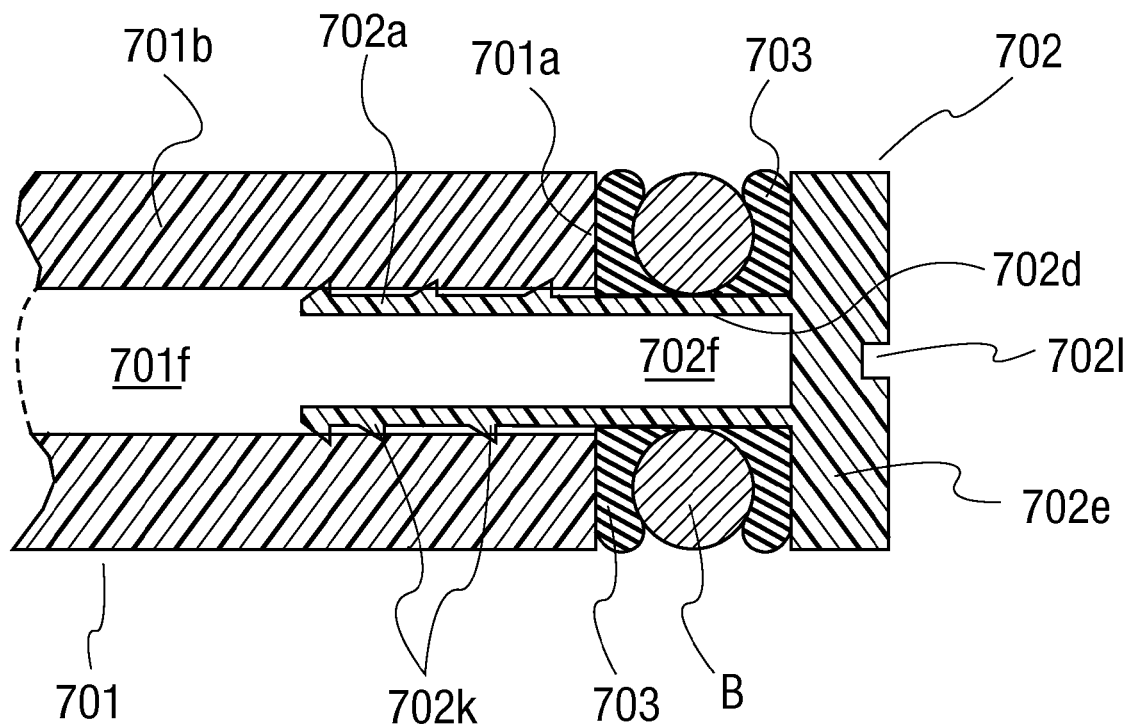
FIG. 10 is a cross-sectional view of an alternative embodiment of a basic body with a screw with self-cutting thread as a fastening element.

FIG. 10 shows another possible embodiment of a rocker pendulum according to the present invention with the fastening of a component B, which is designed as a screw according to FIG. 9. It is, of course, possible to connect the rocker pendulum according to the present invention according to FIG. 10 with any desired motor vehicle component. The essential feature of the embodiment according to FIG. 10 is that the fastening element 702 is not locked with the basic body 701, but the fastening element 702 has a self-cutting thread 702k, with which it can be screwed into the hollow front side 701a, and the self-cutting thread 702k cuts into the inner wall of the cavity 701. The component B is held securely between two elastic elements 703 by the front side 701a of the basic body 701 and the limiting element or screw head 702e of the fastening element 702.

It is obvious that the locking of the above-described possible embodiments as well as the connection by means of self-cutting thread between the fastening element and the basic body may be additionally secured by additional measures. Thus, it is possible, among other things, to additionally bond the two components with one another, so that a captive connection is formed between the basic body and the fastening element. It is likewise possible to do without locks and to bond the fastening element with the basic body only or, e.g., to connect them by means of ultrasound.

The fastening element may have, in principle, any design. Thus, it is possible to ensure an angular offset between the basic body and the motor vehicle component already by means of the fastening element, as is shown, for example, on the left-hand side of FIG. 5, where the fastening means 302h' are arranged at an angle to the first area 302a. The connection between the component and the fastening element may also be selected as desired. It needs only to be guaranteed that a rapid and simple connection, e.g., with the connection being shown, is ensured. The manner in which the locking is designed between the basic body and the fastening element is likewise left up to the person skilled in the art, who can perform this corresponding to the particular needs. The locking shall not be considered to be limited to the lockings shown as an example in the figures, but other embodiments of the recesses or grooves are possible as well.

FIGS. 11 through 13 show another alternative embodiment of a basic body 801, to which a motor vehicle component B is fastened, e.g., on its left-hand side 801a, by means of a fastening element 802 and two elastic elements 803. The basic body 801 has a larger diameter in the middle area 801b than at its front side areas 801a and 801c. The basic body may be manufactured, e.g., first as an extruded blank, which is subsequently expanded, especially in its middle area 801b, according to the blow molding process. This leads to a higher rigidity of the basic body. Due to the manufacturing processes selected, namely, extrusion and/or blow molding, it is possible to design the cross-sectional shape of the basic body as desired. For example, a circular or oval or elliptical cross section, as is shown in FIGS. 12A-B and 13A-B, is conceivable.

While specific embodiments of the invention have been shown and described in detail to illustrate the application of the principles of the invention, it will be understood that the invention may be embodied otherwise without departing from such principles.

What is claimed is:

1. A rocker pendulum for a motor vehicle, the rocker pendulum comprising:
   a motor vehicle component including a stabilizer rod;
   an oblong basic body having an inner wall or an outer wall with a plurality of wall projections of rectangular cross section at equally spaced locations from one another along a length of said inner wall or said outer wall with each said wall projection arranged parallel to an adjacent said wall projection, wherein said plurality of wall projections define a plurality of recesses, each recess being defined between each said wall projection and said adjacent wall projection, said basic body including a hollow extruded section, said basic body being composed of a reinforced plastic; and
   a fastening element connecting said basic body with said motor vehicle component, said motor vehicle component being coaxially pivitably mounted on said fastening element, said fastening element having a plurality of peripheral projections, at least one peripheral projection engaging at least one of said wall projections to form a snap connection for connecting said fastening element to said basic body, said fastening element being composed of a thermoplastic material.

2. A rocker pendulum in accordance with claim 1, wherein said basic body has at least one said recess at least in an area of a free end of said basic body.

3. A rocker pendulum in accordance with claim 2, wherein said plurality of recesses are spaced at equally spaced locations from one another, said recesses being arranged in parallel to one another.

4. A rocker pendulum in accordance with claim 3, wherein said basic body has said recesses arranged over its entire length on the outside and/or on the inside.

5. A rocker pendulum in accordance with claim 2, wherein said recess is a peripheral groove or locking groove or flute.

6. A rocker pendulum in accordance with claim 2, wherein said fastening element is inserted or can be pushed with a first area into said free end of said basic body, wherein said first area has on an outside at least one said peripheral projection which engages said recesses of said basic body or cooperates with said recesses.

7. A rocker pendulum in accordance with claim 6, wherein said fastening element includes a limiting element, in the form of a collar, adjoining said first area.

8. A rocker pendulum in accordance with claim 7, further comprising a sealing element, said sealing element completely enclosing a second area of said fastening element, said sealing element being arranged between said limiting element and a front side of said basic body, said limiting element being connected to said first area of said fastening element via said second area such that said limiting element is integrally connected with said first area.

9. A rocker pendulum in accordance with claim 8, wherein said fastening element with said first and second areas passes through an opening of said motor vehicle component, wherein said opening of said motor vehicle component encloses said second area.

10. A rocker pendulum in accordance with claim 7, wherein said motor vehicle component is pivotably mounted on said fastening element and axially arranged between said limiting element and a front side of said basic body.

11. A rocker pendulum in accordance with claim 10, wherein an elastic is arranged between said limiting element and said front side of said basic body.

12. A rocker pendulum in accordance with claim 11, wherein at least one projection of the fastening element has a wedge-shaped or sawtooth-shaped cross section.

13. A rocker pendulum in accordance with claim 12, wherein said recesses are arranged in parallel to one another.

14. A rocker pendulum in accordance with claim 13, wherein said basic body is made of a fiber-reinforced plastic.

15. A rocker pendulum in accordance with claim 2, wherein said fastening element encloses with a first area or can be pushed over said free end of said basic body, or said first area engages or can be pushed into said hollow section of said basic body, wherein at least said first area is bonded or welded to said outer or inner wall of said basic body.

16. A rocker pendulum in accordance with claim 1, wherein said motor vehicle component is mounted elastically at said fastening element or between said fastening element and said basic body.

17. A rocker pendulum in accordance with claim 1, wherein said fastening element sealingly closes a front side of said basic body and is designed as a plug.

18. A rocker pendulum in accordance with claim 1, wherein said basic body is made of a fiber-reinforced plastic.

19. A rocker pendulum in accordance with claim 1, wherein said basic body has a circular, elliptical or oval cross section.

20. A rocker pendulum in accordance with claim 1, wherein said basic body comprises an axle component or a suspension component, said fastening element having a limiting element located at a free end thereof, said fastening element having a stem portion free of peripheral projections located between said plurality of peripheral projections and said limiting element, said motor vehicle component being pivotably mounted to said stem portion and axially arranged between said limiting element and a free end of said basic body.

21. A rocker pendulum for a motor vehicle, the rocker pendulum comprising:

a motor vehicle component including a stabilizer rod;

a basic body having a wall with a plurality of radially outwardly extending rows of teeth, with each tooth row of said rows of teeth comprising an annular projection of rectangular cross section or circumferentially spaced apart annular segment projections of rectangular cross section with each said tooth row being parallel and at an axially spaced location from an adjacent tooth row along a length of said wall to define a plurality of parallel recesses, with each recess of said plurality of recesses being between one said tooth row and another said tooth row of said plurality of teeth, each said tooth having an engagement surface, said basic body including a hollow extruded section, said basic body being composed of a reinforced plastic, said basic body including an axle component or a suspension component; and a fastening element having a plurality of peripheral projections with a first surface, said first surface being complementary to said tooth engagement surface and contacting said engagement surface upon deformation of one or both of said basic body and said fastening element to form a snap fit connection for connecting said basic body with said motor vehicle component, said motor vehicle component being pivotably mounted on said fastening element and axially arranged between an end portion of said fastening element and a front side of said basic body, said fastening element being composed of a thermoplastic material.

22. A rocker pendulum for a motor vehicle, the rocker pendulum comprising:

a motor vehicle component including a stabilizer rod;

an oblong basic body having an inner wall with a plurality of wall projections of rectangular cross section at equally spaced locations from one another along a length of said inner wall with each said wall projection arranged parallel to an adjacent said projection, wherein a recess is defined between each said wall projection and said adjacent wall projection, said basic body including a hollow extruded section, said basic body having at least one said recess at least in an area of a free end of said basic body at said inner wall; and a fastening element connecting said basic body with said motor vehicle component, said motor vehicle component being coaxially pivotably mounted on said fastening element, said fastening element having a plurality of peripheral projections, at least one said peripheral projection engaging at least one of said wall projections, said fastening element having a first area and a second area, said fastening element being inserted with said first area into said free end of said basic body, said first area having on an outside at least one said peripheral projection which engages said recesses of said basic body, said fastening element including a limiting element, in the form of a collar, adjoining said first area directly or via said second area or is made in one piece with said first area;
a sealing element arranged between said limiting element and a front side of said basic body, said sealing element completely enclosing said second area.

23. A rocker pendulum in accordance with claim 22, wherein said basic body includes a suspension component or an axle component.

24. A rocker pendulum for a motor vehicle, the rocker pendulum comprising:
a motor vehicle component including a stabilizer bar;
an oblong basic body having an inner wall with a plurality of wall projections of rectangular cross section at equally spaced locations from one another along a length of said inner wall with each said wall projection arranged parallel to an adjacent said wall projection, wherein a recess is defined between each said wall projection and said adjacent wall projection, said basic body including a hollow extruded section, said basic body having at least one said recess at least in an area of a free end of said basic body at said inner wall; and
a fastening element connecting said basic body with a motor vehicle component, said motor vehicle component being coaxially pivotably mounted on said fastening element, said fastening element having a plurality of peripheral projections, at least one said peripheral projection engaging at least one of said wall projections, said fastening element having a first area and a second area, said fastening element being inserted with said first area into said free end of said basic body, said first area having on an outside at least one said peripheral projection which engages said recesses of said basic body, said fastening element including a limiting element, in the form of a collar, adjoining said first area directly or via said second area or is made in one piece with said first area;
a sealing element arranged between said limiting element and a front side of said basic body, said sealing element completely enclosing said second area, said fastening element with said first and second areas passing through an opening of said motor vehicle component to be connected with said rocker pendulum, wherein said opening of said motor vehicle component encloses said second area.

25. A rocker pendulum in accordance with claim 24, wherein said basic body includes an axle component or a suspension component.

26. A rocker pendulum for a motor vehicle, the rocker pendulum comprising:
a motor vehicle component including a stabilizer rod;
an oblong basic body having an inner wall with a plurality of wall projections of rectangular cross section at equally spaced locations from one another along a length of said inner wall with each said wall projection arranged parallel to an adjacent said wall projection, wherein a recess is defined between each said wall projection and said adjacent wall projection, said basic body including a hollow extruded section, said basic body having at least one said recess at least in an area of a free end of said basic body at said inner wall; and
a fastening element connecting said basic body with said motor vehicle component, said motor vehicle component being coaxially pivotably mounted on said fastening element, said fastening element having a plurality of peripheral projections, at least one said peripheral projection engaging at least one of said wall projections, said fastening element being inserted with a first area into said free end of said basic body, said first area having on an outside at least one said peripheral projection which engages said recesses of said basic body, said fastening element including a limiting element, in the form of a collar, adjoining said first area directly or via a second area or is made in one piece with said first area, said motor vehicle component being arranged between said limiting element and a front side of said basic body, wherein an elastic element is arranged between said limiting element and said front side of said basic body.

27. A rocker pendulum in accordance with claim 26, wherein said basic body includes an axle component or a suspension component.

28. A rocker pendulum for a motor vehicle, the rocker pendulum comprising:
a motor vehicle component including a stabilizer bar linkage element;
an oblong basic body having an inner wall with a plurality of wall projections of rectangular cross section at equally spaced locations from one another along a length of said inner wall with each said wall projection arranged parallel to an adjacent said wall projection, wherein a recess is defined between each said wall projection and said adjacent wall projection, said basic body including a hollow extruded section, said basic body having at least one said recess at least in an area of a free end of said basic body at said inner wall; and
a fastening element connecting said basic body with said motor vehicle component, said motor vehicle component being coaxially pivotably mounted on said fastening element, said fastening element having a plurality of peripheral projections, at least one said peripheral projection engaging at least one of said wall projections, said fastening element being inserted with a first area into said free end of said basic body, said first area having on an outside at least one said peripheral projection which engages said recesses of said basic body, said fastening element including a limiting element, in the form of a collar, adjoining said first area directly or via a second area or is made in one piece with said first area, said motor vehicle component being arranged between said limiting element and a front side of said basic body, wherein an elastic element is arranged between said limiting element and said front side of said basic body, wherein at least one said peripheral projection of said fastening element has a wedge-shaped or sawtooth-shaped cross section.

29. A rocker pendulum for a motor vehicle, the rocker pendulum comprising:
a motor vehicle component including a stabilizer rod;
an oblong basic body having an inner wall with a plurality of wall projections of rectangular cross section at equally spaced locations from one another along a length of said inner wall with each said wall projection arranged parallel to an adjacent said wall projection, wherein a recess is defined between each said wall projection and said adjacent wall another projection, said basic body including a hollow extruded section, said basic body having at least one said recess at least in an area of a free end of said basic body at said inner wall; and
a fastening element connecting said basic body with said motor vehicle component, said motor vehicle component being coaxially pivotably mounted on said fastening element, said fastening element having a plurality of peripheral projections, at least one said peripheral projection engaging at least one of said wall projections, said fastening element being inserted with a first area into said free end of said basic body, said first area having on an outside at least one said peripheral projection which engages said recesses of said basic body, said fastening element including a limiting element, in the form of a collar, adjoining said first area directly or via a second area or is made in one piece with said first area, said motor vehicle component being arranged between said limiting element and a front side of said basic body, wherein an elastic element is arranged between said limiting element and said front side of said basic body, wherein at least one said peripheral projection of said fastening element has a wedge-shaped or sawtooth-shaped cross section, said basic body and said fastening element forming a snap connection with one another.

30. A rocker pendulum for a motor vehicle, the rocker pendulum comprising:

a motor vehicle component including a stabilizer rod;

an oblong basic body having an inner wall with a plurality of wall projections of rectangular cross section at equally spaced locations from one another along a length of said inner wall with each said wall projection arranged parallel to an adjacent said wall projection, wherein a recess is defined between each said wall projection and said adjacent wall projection, said basic body including a hollow extruded section, said basic body having at least one said recess at least in an area of a free end of said basic body at said inner wall, said basic body being composed of a fiber-reinforced plastic; and a fastening element connecting said basic body with said motor vehicle component, said motor vehicle component being coaxially pivotably mounted on said fastening element, said fastening element having a plurality of peripheral projections, at least one said peripheral projection engaging at least one of said wall projections, said fastening element being inserted with a first area into said free end of said basic body, said first area having on an outside at least one said peripheral projection which engages said recesses of said basic body, said fastening element including a limiting element, in the form of a collar, adjoining said first area directly or via a second area or is made in one piece with said first area, said motor vehicle component being arranged between said limiting element and a front side of said basic body, wherein an elastic element is arranged between said limiting element and said front side of said basic body, wherein at least one said peripheral projection of said fastening element has a wedge-shaped or sawtooth-shaped cross section, said basic body and said fastening element forming a snap connection with one another, said recesses being arranged in parallel to one another.

* * * * *